: US 7,676,508 B2
(45) Date of Patent: Mar. 9, 2010

(12) United States Patent
Robert

(54) METHOD AND SYSTEM FOR RECORDING AND REPLAYING INPUT-OUTPUT REQUESTS ISSUED BY A USER-MODE PROGRAM

(75) Inventor: Christophe F. Robert, Newcastle, WA (US)

(73) Assignee: Microsoft Corporation, Redmond, WA (US)

( * ) Notice: Subject to any disclaimer, the term of this patent is extended or adjusted under 35 U.S.C. 154(b) by 1092 days.

(21) Appl. No.: 10/985,235

(22) Filed: Nov. 10, 2004

(65) Prior Publication Data

US 2006/0101476 A1    May 11, 2006

(51) Int. Cl.
*G06F 12/00* (2006.01)
*G06F 17/30* (2006.01)
(52) U.S. Cl. .................. 707/204; 707/200; 707/202
(58) Field of Classification Search ............... None
See application file for complete search history.

(56) References Cited

U.S. PATENT DOCUMENTS

| 5,157,779 A | * | 10/1992 | Washburn et al. ............ 714/37 |
| 5,214,780 A | * | 5/1993 | Ingoglia et al. ............ 718/106 |
| 7,051,053 B2 | * | 5/2006 | Sinha ........................ 707/204 |

* cited by examiner

*Primary Examiner*—Baoquoc N To
(74) *Attorney, Agent, or Firm*—Workman Nydegger

(57) ABSTRACT

I/O request data for user-mode programs is recorded into a log, which later allows the I/O requests to be replayed. By substantially exact replay, tests are performed with different versions/combinations of kernel components using the same I/Os as when recorded. A user-mode record/replay program and kernel-mode filter driver record a program's I/O requests, such as data I/O request packet (IRP) data received by the filter driver. While recording, tests exclude IRPs not directly resulting from program requests. Recorded I/O request data is maintained in log file records. At replay time, the records are read and corresponding I/O requests sent towards the storage volume as if requested by the original program. Tables are maintained for information relevant to the replay context, such as file handles, file IDs, and short names that vary from the record context. Substitution from the tables allows I/O requests to be replayed as originally issued.

39 Claims, 7 Drawing Sheets

METHOD AND SYSTEM FOR RECORDING AND REPLAYING INPUT-OUTPUT REQUESTS ISSUED BY A USER-MODE PROGRAM

COPYRIGHT DISCLAIMER

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The invention relates generally to computer programs, and more particularly to testing the interoperability of application programs.

BACKGROUND

Many computer program bugs are found very late in the product cycle, or in a worse case, by customers. Indeed, given a large enough market, software consumers will find numerous bugs in software programs, which can reflect poorly on the developer. Thus, an important part of software development is testing to eliminate bugs in software, and to have the software designed to otherwise handle unusual circumstances. That is one reason why Beta testing is used, so that by sheer numbers, many users (who understand that bugs are likely early in the development process) can help to debug a product before it is sold to consumers.

Beta testing is only one way software is tested, and can only be done when the product under development is reasonably stable and safe enough to give to those who will use it in the real world. To get to this point, and also to find bugs that even large numbers of Beta testers may not find, software producers also run their programs through pre-arranged tests.

While these tests find many bugs, there is no way for developers to realistically anticipate each of the possible combinations of actions that can cause a bug. Testing all combinations is not possible. By way of a general example, consider an application program's or shell program's I/O (input/output) requests directed towards a file system or remote server; it is virtually impossible to test all I/O combinations since they are essentially infinite, especially if timing among the I/O requests is a factor.

As a more particular example, consider a filter driver component such as a quota filter driver that limits the amount of space a user may consume on a shared storage volume. The test team that tests the quota filter driver is not responsible for testing the operating system shell or a suite of application programs such as Microsoft® Office. Likewise the shell and program suite teams are not responsible to test quota filter drivers. Addition of another filter driver, such as an antivirus product, can also change the way I/Os behave. Essentially, there are no tests as to whether the I/Os triggered by application programs and/or the shell work properly, let alone when using a certain filter driver or combination of filter drivers, other than tests performed manually, which are very time consuming and error prone. Further, it is not practical to redo these manual tests on a regular basis, even though various versions of programs and filter drivers are regularly released.

In sum, the I/Os generated by an application program can uncover program bugs in the program as well as in lower-level filter drivers that handle corresponding I/Os requests below the program. However finding and fixing those bugs often requires significant manual testing to recreate the actions that first found the bug. What is needed is a way to automate testing tasks that otherwise have to be done manually when testing the compatibility of kernel-mode components with user-mode programs.

SUMMARY OF THE INVENTION

Briefly, the present invention is directed towards a system and method that records data for I/Os originated by user-mode programs into a log, and later allows the log to be replayed by a replay engine in a manner that recreates the user-mode program's I/O requests, (even when the originating user-mode program is not present). As a result, tests can be performed with different versions and/or combinations of kernel-mode components using exactly the same I/Os as a previous test.

In one implementation, the recording mechanism includes a user-mode record/replay application program and a kernel-mode filter driver. The kernel-mode filter driver receives and records data from I/O request packets (IRPs) sent into the filter drivers that correspond to I/O requests originated from a user-mode program being recorded. The I/O request packets may be destined for a local storage volume or for a network drive, and the filter driver may be instructed as to which path or paths to record I/O requests. The recorded I/O request data may be preserved as records or the like in a log file.

In one alternative, the record I/O filter driver records I/O requests into a buffer, which the user mode record/replay application occasionally reads for writing to the log file. In another alternative implementation, the record I/O filter driver may write to the log file directly.

At a later replay time, a replay engine (that may be incorporated into the user-mode record/replay application program) reads the log file to replay the I/O requests, such as in a modified test setting having one or more kernel-mode components (e.g., filter drivers) slightly modified from the state of the components at record time. For example, one version of a quota filter driver may be used in the recording context, and a newer version used in the replay context to determine if any difference is found with respect to I/O handling, which may indicate a bug.

In one implementation, the present invention uses a kernel-mode filter driver to record the I/O-related data in the IRPs. The present invention may be incorporated into various architectures, including one in which an I/O manager generates IRPs based on I/O requests from the user-mode program being recorded, and passes the IRP to a filter manager. In turn, for each IRP, the filter manager calls on the filter driver or drivers that have registered for calls based on a given IRP type, which for the filter driver that records I/O requests is any IRP that a user-mode program can cause the I/O manager to produce. Based on an ordering, the record I/O filter driver is the first filter driver called for each new IRP. The user-mode record/replay application and its corresponding filter driver may have a private communication channel.

Other architectures are feasible, including one in which filter drivers are arranged in a stacked manner wherein each filter driver processes received IRPs as desired and sends them (modified or unmodified) up or down the stack as appropriate. Each filter driver that receives an IRP may decide to perform some action, or may determine that it is not interested in the IRP. Again, the record I/O filter driver is the top one in the stack.

The recording and later replaying of I/Os dramatically reduces the time to test, relative to manual testing of any component or combination of components that are related to file system operations. The user-mode application allows a tester to selective start and stop recording I/Os by receiving user-provided commands and configuration information, and sending corresponding messages to the record I/O filter driver.

When started, the record I/O filter driver records each of the I/O requests (e.g., those corresponding to previously specified paths) by constructing records or the like based on the IRP, including file object information in each IRP, information on the type of IRP, and the parameters within the IRP. Other information may also be recorded, such as security descriptor data. The IRP data is recorded in conjunction with the volume ID, so that the IRP is replayed to a corresponding volume during replay. Recorded IRPs include IRP_MJ_CREATE, IRP_MJ_CLEANUP, IRP_MJ_SET_INFORMATION, IRP_MJ_WRITE, IRP_MJ_FILE_SYSTEM_CONTROL (e.g., FSCTL_SET_COMPRESSION, FSCTL_SET_OBJECT_ID and so forth), IRP_MJ_ACQUIRE_FOR_SECTION_SYNCHRONIZATION. Other IRPs such as IRP_MJ_READ, IRP_MJ_DIRECTORY_CONTROL (to enumerate files and sub-directories), IRP_MJ_QUERY_INFORMATION, and IRP_MJ_QUERY_EA (related to extended attributes) also may be recorded.

Certain IRPs that reach the record filter driver are generated by something other than directly in response to a call from the user-mode program that is having its I/O requests recorded, and those IRPs have to be discarded rather than recorded. One such IRP-type that may or may not be recorded is related to paging I/Os. In general, paging I/O IRPs result from a cache manager flushing a cache, and are originated by the cache manager, not the I/O manager in response to the API call from the user-mode program being recorded. Such paging I/Os are marked as such and are discarded, unless an exception applies corresponding to a mapped file section. With a mapped section, the program being recorded can write to memory and thus change the state of the mapped section without issuing an I/O request. A memory manager later flushes the written page or pages to disk via an IRP marked with the paging flag. This type of paging IRP needs to be recorded because it is the way in which the program's change is written to the disk. To distinguish between the types of paging IRPs, when a user-mode program requests a mapped section, information about the mapped section request is maintained in association with the file, e.g., in a stream context associated with the file. In this manner, any incoming paging I/Os associated with a mapped file are recognized and recorded, while other paging I/Os are not recorded.

Another time that I/Os are not recorded involves reparse points, which are used for performing operations such as redirecting I/Os to another volume. In general, the file system will not succeed a requested operation if an IRP has a reparse point, and return the IRP with a status reparse error. Reparse point errors may result in the IRP being turned around by the I/O manager and sent back through the filter drivers. Such an I/O manager-generated indirect IRP should not be recorded, because the user-mode program did not directly request it. To avoid recording the second, indirectly-generated IRP, during the first IRP, the reparse point IRP data is saved in conjunction with the IRP's thread context in a table. When the second IRP is received, it is on the same thread context, because the I/O manager does not change the thread. If there is a status reparse indicated in the table for that thread, then the IRP is known to be a continuation of the other IRP, and can then be discarded.

Some time later, the log file is closed and can then be used to replay the I/O requests. To properly test the interaction among components with respect to I/O handling, the replay environment needs to be identical to the state of the machine before recording the I/Os, with respect to the storage volume or volumes and the stored contents. For example, the state of the files need to be the same on each storage volume, and the drive letters need to match.

As part of replay, various information is maintained so that the replayed I/O requests will correspond to those that were sent at the time of recording the I/O requests. More particularly, for optimal replay, the replay engine of the user-mode record/replay program replays I/Os the way that they were initially issued. For example, files may be created and opened in many ways; if during recording, a file was opened by the user-mode program using a short name, (which is essentially a filename with an eight-character maximum followed by an optional extension of up to three characters, sometimes referred to as "8.3" format), the file is opened again with a short name at replay time, and not a long file name for that file. Similarly, files may be opened by file IDs instead of by path. If so, each such open will be recorded this way, whereby the replay engine likewise will open the corresponding file by its file ID during replay. In general, any type of create is replayed in the same way it was recorded, including normal creates via a path, relative opens in which part of the path is represented by a directory handle, opens that use a File ID, and opens that use short names.

To facilitate the replay, various tables are maintained, including a FILE_OBJECT to new file handle (in the replay context) association table, an old (record context) file ID to new (replay context) file ID association table. File IDs may be obtained via a query to the file system, although the privileged kernel-mode filter driver may be used to assist in getting the file IDs to prevent situations in which the user mode replay engine cannot obtain the file ID due the file having been opened with exclusive access. Note that the filename may be maintained in the tables as well, e.g., for debugging purposes. Directory handles obtained in the replay context are likewise cached, and used for relative opens, which may also use volume handles that are previously maintained the replay engine.

Object IDs, which are provided by the system and are optionally requested to correspond to a file, are handled similar to file IDs. The file system may also be queried for a file's object ID, which is then used for a create/open request.

Other IRPs generally use the handle maintained in the FILE_OBJECT, handle association table, e.g., IRP_MJ_CLEANUP, IRP_MJ_SET_INFORMATION, and read and write requests.

Other advantages will become apparent from the following detailed description when taken in conjunction with the drawings, in which:

DETAILED DESCRIPTION

Exemplary Operating Environment

Figure 1:
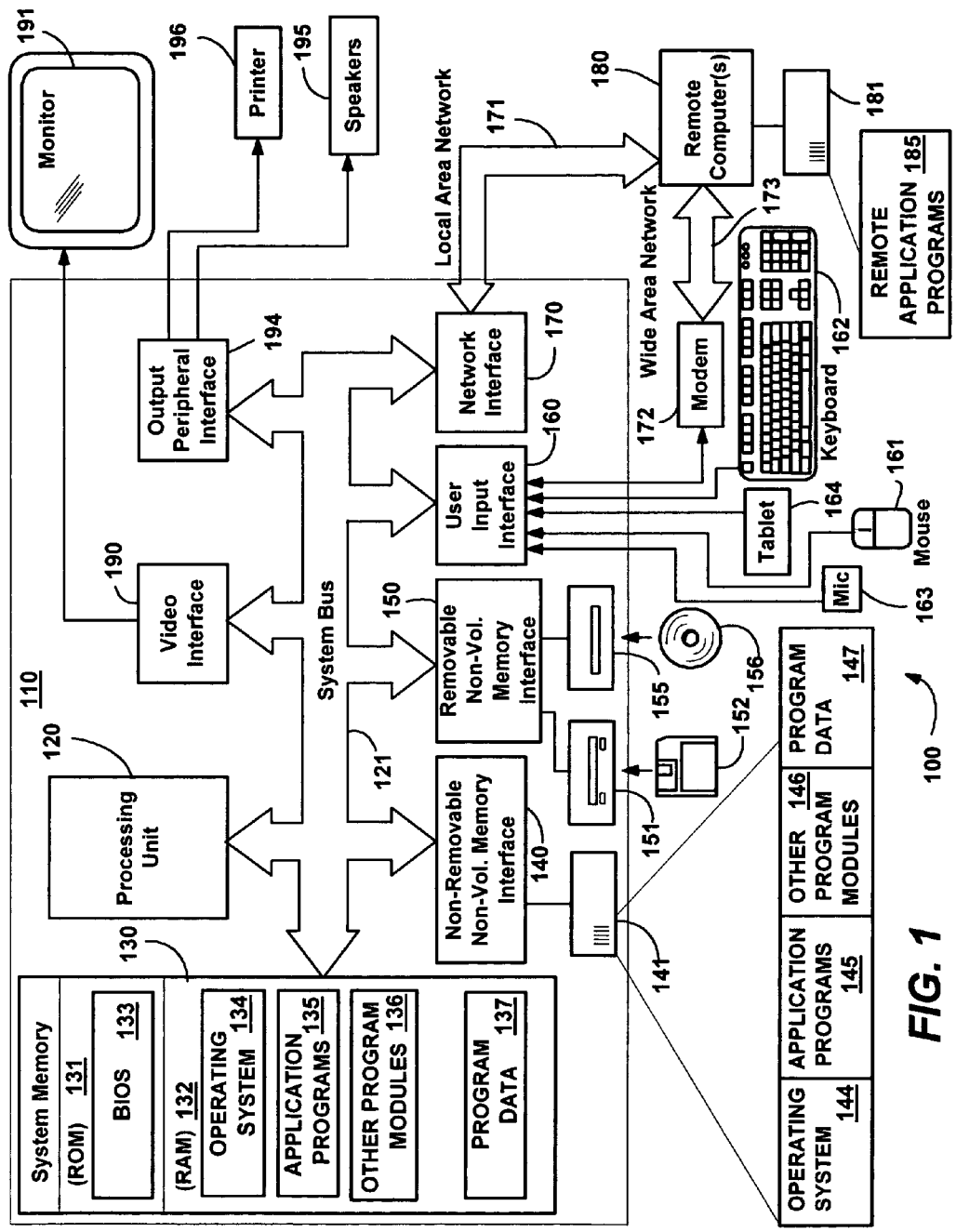
FIG. 1 is a block diagram generally representing a computer system which may host a storage mechanism in accordance with various aspects of the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Record and Replay I/Os

The present invention is generally directed towards a system and method by which the I/O requests issued by user-mode (e.g., shell or application) programs are recorded in a manner that allows their replay at a later time, such as in a modified testing context having one or more varied kernel-mode components. A typical example of recording is to record the I/Os from a shell explorer or an application program such as a processing program, in which the number of I/Os may be on the order of hundreds, thousands, or tens of thousands of (or even more) file system-directed requests to open files, read, write, close and so forth. When replayed by a replay application program, virtually the exact same requests are issued, without the original application (e.g., word processing) needing to be executed, or even be present on the system. Thus, a single set of I/O requests may be developed and tested numerous times through different components, different combinations of components, different versions of components, and so forth, with the results reevaluated for each test. However, although the invention provides numerous benefits and advantages in testing, it has other uses, such as, for example, to recreate a document in the exact order it was created and saved at various times, and so forth with respect to any file system operations.

As will be understood, numerous ways to implement the present invention are feasible, and only some of the alternatives are described herein. For example, the present invention is primarily described below with reference to I/O request packets (IRPs) that pass through a set of filter drivers, in which the IRP passing may be controlled by a manager via pre-callbacks and post-callbacks, or in which the passing may be through a stack of filter drivers, sequentially from one filter driver to the next. Moreover, the program having its I/Os being recorded may be writing to one or more local file system volumes and/or to one or more network servers. Notwithstanding, other types of filter driver arrangements, I/O passing and/or storage options are feasible. For example, the present invention may be configured to work in an architecture where requests are not passed as IRPs, but in some other format. As such, the present invention is not limited to any particular examples used herein, but rather may be used various ways that provide benefits and advantages in computing in general.

Figure 2:
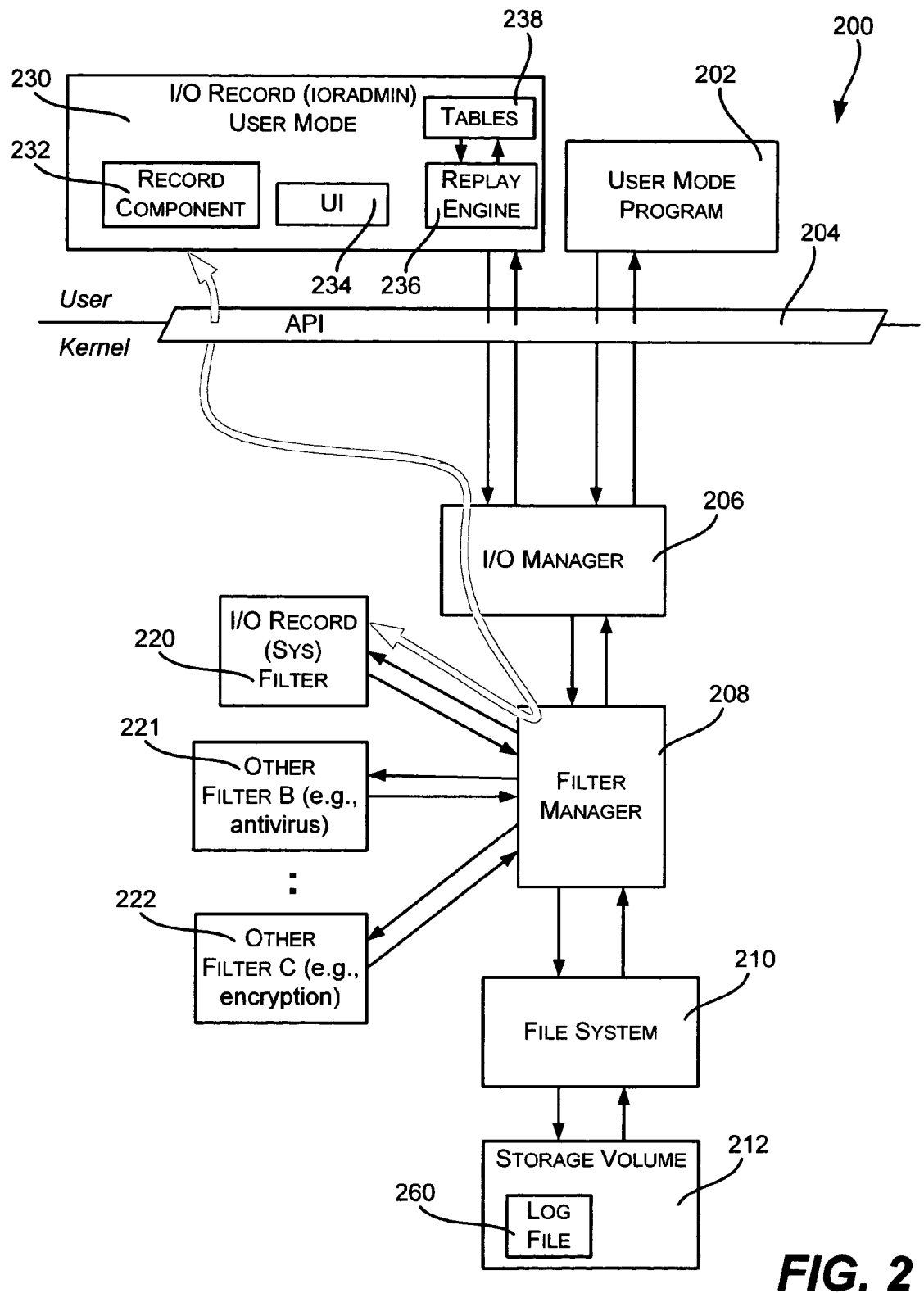
FIG. 2 is a block diagram including a filter manager architecture and components for recording and replaying a program's I/O requests in accordance with various aspects of the present invention.

As represented in FIG. 2, an exemplary arrangement 200 of components of a system is provided into which the present invention may be incorporated. The components include one or more user-mode (e.g., application) programs 202, a set of application programming interfaces (APIs) 204, an input/output (I/O) manager 206, a filter manger 208, a file system 210, storage volume 212, and filters 220-222. Note that the present invention may work with multiple file systems and/or multiple storage volumes, however for purpose of simplicity, FIG. 2 shows one file system and one storage volume.

In accordance with an aspect of the present invention, two components shown in FIG. 2 are directed towards recording the I/Os from one or more of the other user-mode programs 202 for later replay. These components include the user-mode record/replay (IORADMIN) application program 230 and one of the filter drivers, namely the I/O record (sys) filter 220. For various purposes described below, the user-mode record/replay application program 230 includes a record component 232, a user interface 234 (which may be via the command prompt), a replay engine 236 and various replay tables 238. As will be understood, the separation of these components is for convenience in this architecture, and the division in structure and/or functionality between them is somewhat arbitrary except that in general, kernel-mode components are generally written to be highly efficient and as straightforward as possible to avoid potential errors. Thus, although it is understood that essentially all of the present invention's recording operations may be implemented in the filter driver component 220, having the user-mode component 230 provides certain advantages and benefits in recording, and thus is used in environments where some communication channel exists between the user-mode component 230 and the kernel-mode component 220. Notwithstanding, it is feasible to implement a filter driver that is installed and configured, such as following system boot, and logs data and I/Os into a file until halted in some manner; the file then contains the information and can be independently accessed as needed.

User-mode computer programs 202 often make file system-directed requests via API calls through the API set 204 to the I/O manager 206. The I/O manager 206 may determine what I/O request or requests should be issued to fulfill each program request, and sends the corresponding request or requests to the filter manager 208. In the example implementation described herein, the I/O manager sends requests in the form of an I/O request packet, or IRP. The I/O manager 204 also returns status codes and/or data to the user-mode programs 202 in response to the API calls.

In general, a filter driver is software code that is able to inspect and possibly modify data sent to or received from the file system 210. For example, an antivirus filter driver may look for virus signatures, a quota filter driver may watch a user's disk space consumption, an encryption filter driver may encrypt data on its way to the file system and decrypt it on the way back, and so forth.

In one implementation, described in U.S. patent application Ser. No. 10/315,384, filter drivers may register (e.g., during an initialization procedure) with a registration mechanism in the filter manager 208. For efficiency, each filter driver typically will only register for file system requests in which it may be interested in processing. To this end, as part of registration, each filter driver notifies the filter manager 208 of the types of I/O requests in which it is interested (e.g., create, read, write, close, rename, and so forth). For example, an encryption filter driver may register for read and write I/Os, but not for others wherein data does not need to be encrypted or decrypted. Similarly, a quota filter driver may be interested only in object creates and object writes. In the situation of a filter driver that wants to record I/Os, the record filter driver registers for any I/O request that a user-mode program can make.

Figure 3:
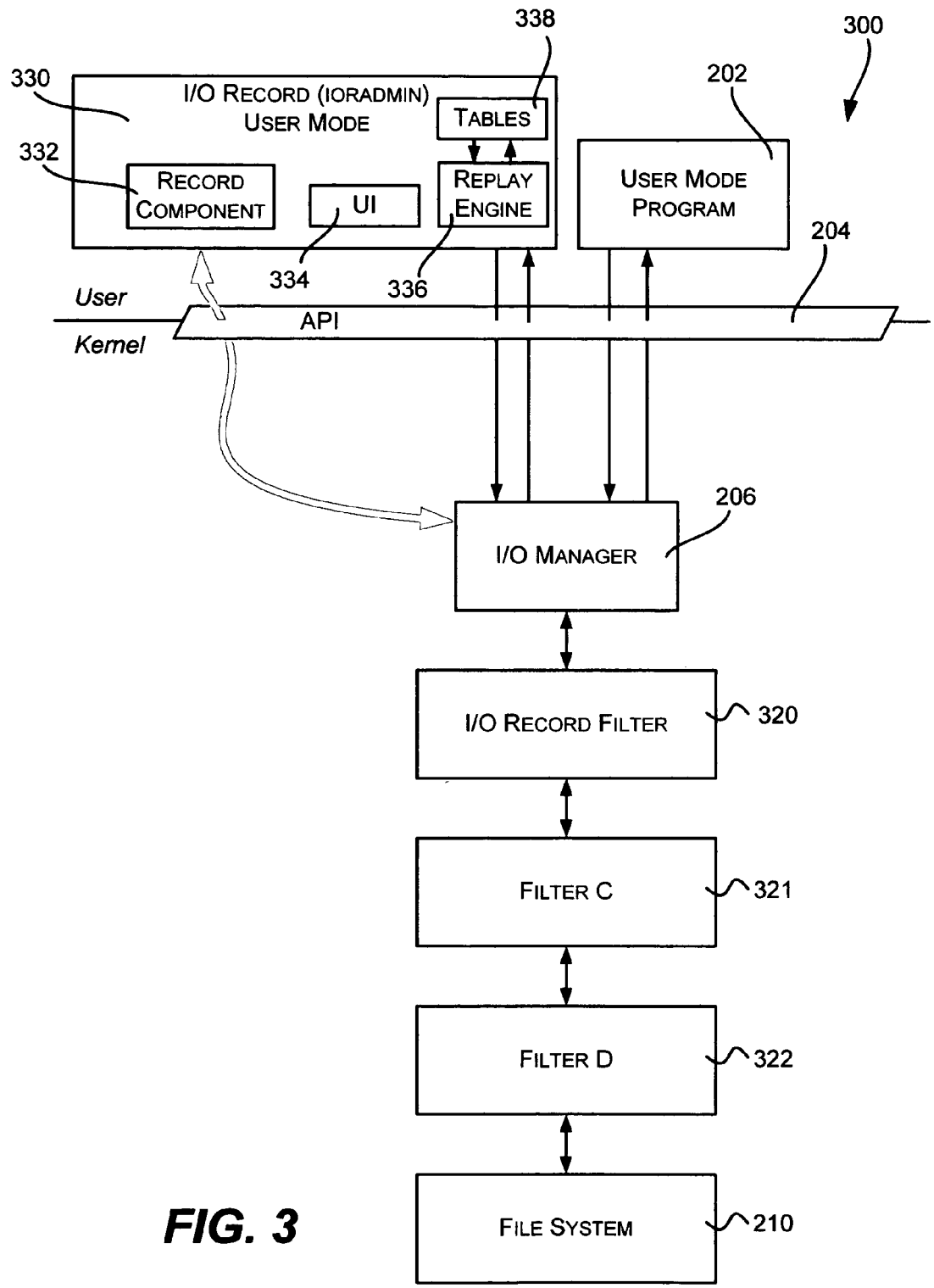
FIG. 3 is a block diagram including an alternative architecture and components for recording and replaying a program's I/O requests in accordance with various aspects of the present invention.
Figure 4:
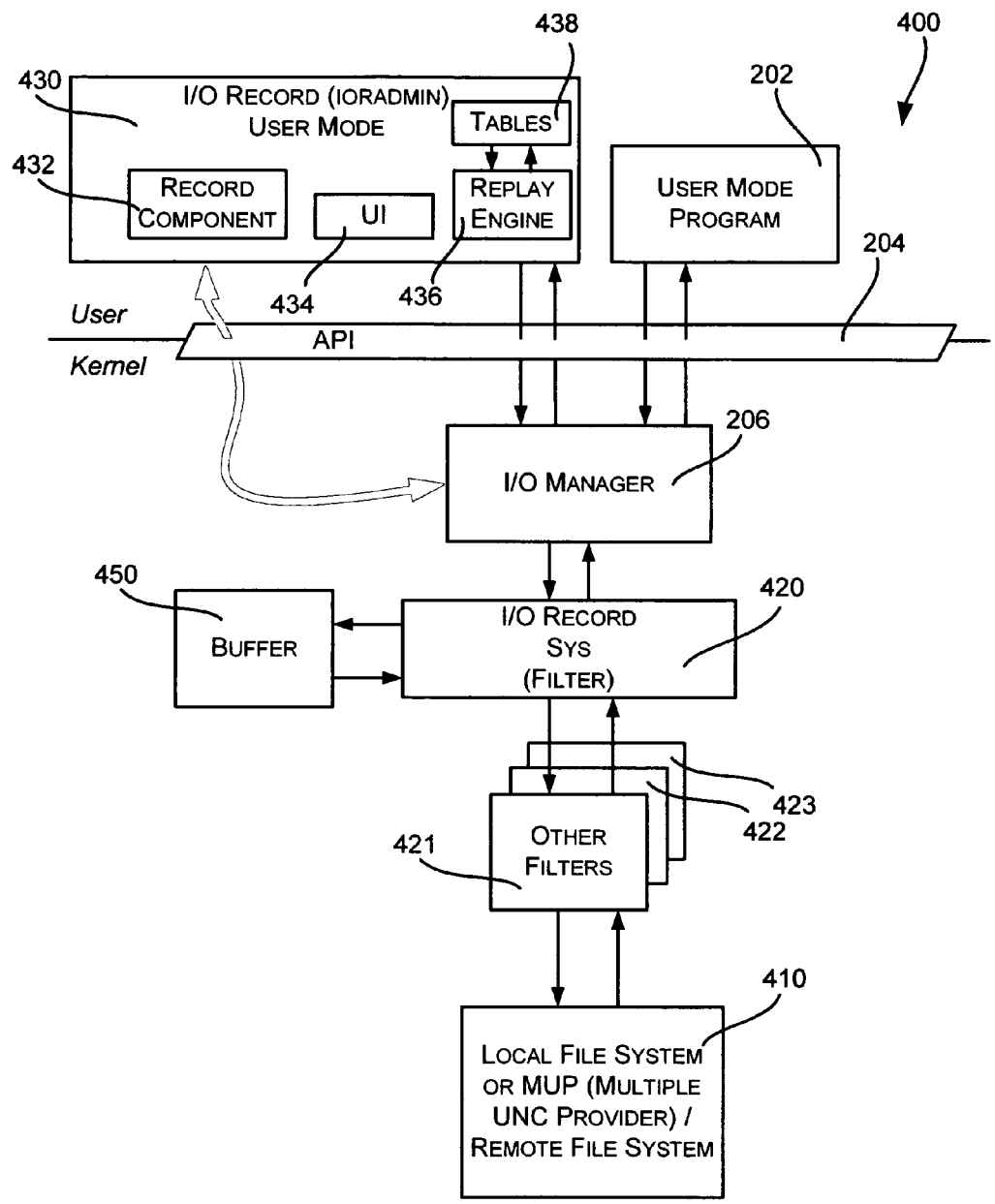
FIG. 4 is a block diagram including components for copying I/O requests into a buffer that are then logged for later replay, in accordance with various aspects of the present invention.

Note that the user-mode record/replay application 230 and its corresponding filter driver 220 may have a private communication channel, e.g., the filter manager 208 recognizes and appropriately routes such private communications. This communication channel is represented in FIGS. 2-4 by the relatively-wide gray arrows; note that this channel may be protected such that administrator-level privileges are required to communicate over it. Also note that in FIGS. 2-4, like components are labeled with like numerals, while components that are alike (possibly identical but at least very similar) are labeled with numbers that share the last two digits (e.g., 220, 320 and 420); note that this does not mean that the components in FIGS. 2-4 that are labeled with identical numerals are required to be identical, only that in these example implementations, they likely do not change between environments.

In addition to specifying the types of I/O requests in which it is interested, a filter driver may further specify whether the filter driver should be notified for pre-callbacks and post-callbacks for each of the types of I/O. A pre-callback is called as data associated with an I/O request propagates from the I/O manager 206 towards the file system 210, while a post-callback is called during the completion of the I/O request as data associated with the I/O request propagates from the file system 210 towards the I/O manager 206. During pre-callback, a filter driver can opt out of receiving a post-callback for a particular IRP even if it is generally registered for those types of IRPs.

In general, the filter manager 208 receives IRPs from the I/O manager 206 and sequentially passes data associated with that IRP to each filter driver registered for that type of request, in an order that generally depends on whether the filter driver modifies the data or not, e.g., an antivirus filter driver should come before an encryption filter driver for data on its way to the file system so that the antivirus filter driver can see the data in its unencrypted form. As will be understood, the recording filter driver 220 of the present invention does not modify data, nor block any IRPs, but rather only copies information for later playback, and thus should be at the top of the ordering; (note that filter drivers that primarily inspect data, such as an antivirus filter driver or quota filter driver, can block a request, whereby exact playback of an program's I/O requests would depend on other factors unless the record I/O filter driver 220 was first in the ordering or at least not after any other filter driver that could change IRP data or behavior).

Filter drivers have a number of capabilities. For example, a filter driver may be attached to one or more volumes, that is, a filter driver may be registered to be called and receive callback data for I/Os related to only one volume or more than one volume. A filter driver may generate its own I/O requests, which may then be passed to other filter drivers. A filter driver may stop an I/O request from propagating further and may instruct the filter manager to report a status code (e.g., success or failure) for the I/O request. A filter driver may store data in memory and persist this data on a storage volume. In general, a filter driver may be created to perform any set of actions that may be performed by a kernel-mode or user-mode process and may be reactive (e.g., wait until it receives I/O requests before acting) and/or proactive (e.g., initiate its own I/O requests or perform other actions asynchronously with I/O requests handled by the I/O manager 206).

In an alternative environment 300 generally represented in FIG. 3, filter drivers (e.g., three are shown, labeled 320-322) may be arranged in a stacked manner, providing another exemplary arrangement of components of a system in which the present invention may operate. In this embodiment, there is no filter manager. Instead, each filter driver processes received IRPs and sends them (modified or unmodified) up or down the stack as appropriate. Each filter driver that receives an IRP may decide to perform some action, or may determine that it is not interested in the IRP.

In the typical environment that has filter drivers stacked in this way, many I/O requests reach the file system, and after the file system 210 services the I/O request, the results are passed back up the stack, e.g., in a reverse order from that in which the IRP was processed on its way to the file system. In this manner, each filter driver may examine the results, may determine whether that filter driver is interested in the results, and may perform actions based thereon before passing the results (changed or unchanged) on towards the next filter driver above it or the I/O manager 206 if the filter driver is at the top of the stack.

The present invention also may operate in a stacked environment, with at least the filter driver 320, but also can have a user-mode component 330 as long as some communication is possible between the user-mode component and the I/O record filter driver. Note that a private communication channel is straightforward to implement, because the I/O record filter driver is first in the stack and can recognize special messages via IRPs sent thereto by the user-mode record/replay program 330 that the filter driver 320 need not forward to any filter drivers below it. FIG. 3 represents these components with different labels relative to FIG. 2, namely 320 and 330, because, for example, they will likely be slightly different from their counterparts 220 and 230 in FIG. 2, e.g., the filter driver 320 will not be set to handle pre-callbacks and post-callbacks and will instead directly process IRPs from the I/O manager 206. Note that even if communication between the user-mode component and the I/O record filter driver is not possible, the filter driver can be installed and configured as necessary (e.g., at boot time) to log an application's I/Os and record to a log file until some event stops the filter driver from recording, and thus the present invention may still be implemented without user-mode code for recording I/Os.

It will be readily recognized that filter drivers may be implemented in many other configurations without departing from the spirit or scope of the invention. In general, a filter driver comprises any object that examines I/O between an application and a file system and that is capable of changing, completing, or aborting the I/O or performing other actions based thereon.

The file system 210 may have one or more corresponding volumes that may be located locally or remotely relative to the machine or machines upon which the user-mode programs 202 execute, although there may be other components involved for network storage. For example, FIG. 4 shows that a multiple UNC provider (MUP) 410 may receive I/O requests and send them over a network to a remote a file system for storing on a file server. Note that in FIG. 4, the block 410 also represents the local file system, depending on the destination of a given I/O request.

FIG. 4 also illustrates a buffer 450, such as a circular buffer, in which records corresponding to recorded I/Os and other data may be temporarily queued for subsequent logging to the log file. In this implementation, the record component 432 of the user mode I/O record/replay application 430 opens the log file in a file system volume, and occasionally reads from the buffer 450 and writes the data that was read from the buffer 450 into the log file. Note that FIG. 4 is intended to represent the filter drivers in any driver architecture, whether the filter manager architecture 200 of FIG. 2, the stacked architecture 300 of FIG. 3, or any other suitable model, and again shows the I/O record filter driver 420 as being first to receive the IRP (or its corresponding data) unmodified by any other filter driver.

In an alternative logging implementation, a filter driver may issue IRPs and write files to the file system, as mentioned above. As such, the filter drivers 220 or 320 need not buffer the data for consumption by the user-mode record/replay program 230 or 330, but may instead write to the log file directly. This is generally represented in FIG. 2 by the presence of the log file 260 without any buffer, although it should be understood that the ability to directly write to the log file 260 is not limited to the filter manager model of FIG. 2, but may be accomplished by any filter driver, including the filter driver 320 in the stacked filter driver architecture 300 of FIG. 3. For purposes of simplicity, the present invention will be described primarily with reference to the buffered model of FIG. 4, in a filter manager-type architecture, except where otherwise noted.

In keeping with the present invention, the recording and later replaying of I/Os dramatically reduces the time to test, relative to manual testing of any component or combination of components that are related to file system operations. In one implementation, the kernel-mode component (e.g., 420) is named IORECORD.SYS, and comprises a file system mini-filter driver that records I/Os and provide an interface to a user-mode application that allows the filter driver to start, stop and configure I/O recording. The user-mode record/replay application (e.g., 430 of FIG. 4), named IORADMIN-.EXE in this implementation, provides a way for a tester to start and stop recording I/Os by receiving user-provided commands and configuration information, and sending corresponding messages to the filter driver 420. The filter driver 420 and user-mode record/replay application 430 then records the I/Os, e.g., via the buffer 450, whether local I/Os directed towards one or more local drives or network I/Os (mapped drives and UNC path) directed to remote servers.

This example user-mode record/replay application 430 also replays the I/Os via a replay engine 436, e.g., by using Microsoft® Windows® NT APIs with essentially the exact same parameters that were used at record time. As can be readily appreciated, the replay engine 436 may be entirely separate from the recording components.

As is generally known with kernel-mode I/O components, when a user-mode program 202 requests creation (or opening) of a file, the I/O manager 206 is responsible for locating or creating a named file object that represents the data file. The I/O manager 206 returns a file handle to the user-mode program 202 for referencing that file while it is open. In the kernel, for these and other user-mode program requests, IRPs are constructed by the I/O manager 206 and sent to the filter driver stack (e.g., 320-322 of FIG. 3), or to the filter manager (e.g., 208 of FIG. 2) for delivering their data to the appropriately-registered filter drivers 220-222. Each IRP contains a pointer to the file object associated with the request. Note, however, that any kernel-mode component can create an IRP and issue it to a kernel-mode filter driver, e.g., using the IoAllocateIrp( ) and IoCallDriver( ) I/O Manager routines. As described below, because the record filter 420 is the first filter manager in the ordering, only IRPs issued by the I/O manager 206 correspond to those that may have come from the user-mode program 202 that is having its I/Os recorded.

To start recording I/Os, the tester/user runs the user-mode record/replay application 430, (e.g., IORADMIN), providing it with operating parameters including a list of paths to record. The number of paths that can be recorded is not limited and the paths can refer either to local drives or network locations. In the case of network locations, the user-mode record/replay application 430 accepts mapped drive letters or UNC paths. It is possible to record network I/Os using the special path "\\" and/or the I/O requests targeted to a remote server using \\servername. By default, the I/O requests are recorded into a file named RECORD.LOG, although the name of the log file may be changed, e.g., by using a /LOG command line option. Command line examples include:

```
IORADMIN /RECORD:C:\ /verbose
IORADMIN /RECORD:C:\MYDIR
IORADMIN /RECORD:Z:\
IORADMIN /RECORD:\\server\share
IORADMIN /RECORD:\\server (all shares on that server)
IORADMIN /RECORD:\\   (all network I/Os)
IORADMIN /RECORD:C:\TEMP
  \\server\share\FOO /LOG:C:\MYLOG.LOG /verbose
```

The user-mode record/replay application 430 obtains the list of the volumes referenced by the input paths (e.g., E:\, X:\ etc); the remote I/Os go through the MUP 410. The user-mode record/replay application 430 attaches an instance of the IORECORD mini-filter driver 420 to each of the volumes corresponding to a local path and to the remote stack (MUP) if network I/Os are being recorded (e.g., equivalent of the FLTMC ATTACH X: IORECORD command line). The user-mode record/replay application 430 saves the volume information in the log file, although as mentioned above, if the filter driver was writing the log file directly, the filter driver would save this path information, which it has received from the user-mode record/replay application 430.

At some time, such as triggered by the tester/user, the user-mode record/replay application 430 sends down a message to activate the filter driver's recording mode, IORECORD_MSG_STARTRECORDING. For each path passed in the command line, the user-mode record/replay application 430 sends the message IORECORD_MSG_ADDPREFIX to the filter driver 420 so that it records only I/Os under that path.

At this point the filter driver 420 records each of the I/O requests under the specified paths, (except for certain exceptions for I/O requests that were not actually generated by the application program, as described below). Each recorded I/O is queued in the temporary buffer 450, with those queued records processed asynchronously by the user-mode record/replay application 430. For example, in this implementation, the user-mode record/replay application 430 obtains new records by sending a message named IORECORD_MSG_GETRECORDS to the filter driver 420. The user-mode record/replay application 430 then writes the records to the log file on one of the storage volumes, which the tester may specify (as described above). To stop recording I/Os, the user-mode record/replay application 430 sends a message (e.g., named IORECORD_MSG_STOPRECORDING) to the filter driver 420.

When the filter driver 420 is in recording mode, the file system-directed I/Os initiated by the user-mode program 202 are thus temporarily intercepted and recorded in the queue with the user input parameters. More particularly, IRP data is recorded in conjunction with the volume ID, so that the IRP is replayed to a corresponding volume during replay, (which may be the same volume or another volume).

In one implementation, the filter driver 420 creates records upon certain low-level IRPs and file system controls (FSCTLS), including those set forth in the following table:

```
IRP_MJ_CREATE
IRP_MJ_CLEANUP
IRP_MJ_SET_INFORMATION
IRP_MJ_GET_INFORMATION
IRP_MJ_READ
IRP_MJ_WRITE
IRP_MJ_FILE_SYSTEM_CONTROL
   Record FSCTLs. E.g.,
      FSCTL_SET_COMPRESSION
      FSCTL_SET_OBJECT_ID
      Etc.
IRP_MJ_ACQUIRE_FOR_SECTION_SYNCHRONIZATION
```

Other IRPs such as IRP_MJ_DIRECTORY_CONTROL (to enumerate files and sub-directories), IRP_MJ_QUERY_INFORMATION, IRP_MJ_QUERY_EA (related to extended attributes) also may be recorded. Reads when passed to NtCreateFile may also be recorded and replayed. Reparse points, described below, may or may not be handled, (e.g., CREATE returning STATUS_REPARSE and replay reparse point creation/deletion) depending on whether the application program generated the I/O. Security descriptors may also be recorded.

To provide a maximum amount of benefit while being flexible as to what can be tested, the present invention records and replays I/Os exactly the way they were issued by the user-mode program 202 being recorded. For example if a program requests a file be opened via a file identifier (file ID, described below) instead of by providing a path and filename, for example, the request is recorded such that during replay the file is again opened via a file ID, and not in some other manner. This is true for other types of recorded requests.

As will be understood, however, there are certain IRPs that reach the record filter driver 420 that have to be discarded rather than recorded. In particular, these correspond to certain IRPs that are generated by something other than the user-mode program 202 that is having its I/O requests recorded. Note that it would be equivalent to record these I/O requests and flag them in some manner so that they will not be replayed, although it is more efficient to simply not record them.

One such IRP-type that may or may not be recorded is related to paging I/Os. In general, in many situations, a cache manager component will cache write requests directed to the file system in a RAM cache, and then at some later time flush the cache and send the requests to the file system for persisting to the appropriate file on a storage volume. However, when the cached is flushed, the cache manager sends another IRP which reaches the I/O record filter driver 420. If this cache-flushing IRP is recorded, the file data may become corrupted on replay, such as due to timing issues among write requests. Note that the write IRP generated by the user-mode program 202 was already recorded as if the data was directly and immediately written to the file system, and if replayed into the same environment, will likewise generate a paging I/O; replaying a recorded cache-flushing paging I/O would be incorrect.

While this flushing-generated IRP generally looks like the application program may have generated it, IRPs for paging I/Os are marked with the paging flag. As a result, I/O record filter driver 420 is able to detect such a situation. User-mode applications cannot issue paging I/Os. As is understood, the goal is to replay the write requests issued by the application, and not IRPs generated when the system flushes dirty pages to the disk.

However, there is an exception to this rule of not recording paging I/Os, which involves mapped sections in which a file (or some section of the file) is mapped into memory. With a mapped section, a memory manager will read data from the storage volume into memory as it is needed, via a page fault mechanism. The program can write to memory and thus change the state of the mapped section, referred to as "dirtying" the page for each page that has a change written to it. For example, to modify a file user mapped files, a user-mode program typically makes the following types of calls and performs similar operations:

```
H1 = CreateFile( ) ;
H2 = CreateFileMapping(H1) ;
P = MapViewOfFile (H2, Offset, Length)
Modify memory pointed by P
CloseHandle (H2)
CloseHandle (H1)
```

The memory manager knows when pages are dirty, and at some time later flushes the dirtied page or pages to disk via a paging write IRP marked with the paging flag. Because this corresponds to what the user-mode program wrote to memory, but no other IRP was generated for this write, this type of paging IRP needs to be recorded.

To distinguish such memory-mapped paging IRPs (e.g., from cache-flushing paging IRPs), when a user-mode program requests a mapped section, (e.g., via an I/O request packet for mapped file creations of type IRP_MJ_ACQUIRE_FOR_SECTION_SYNCHRONIZATION), the I/O record filter driver 420 detects the request and flags its knowledge of this request in association with the file. In one implementation, the information is flagged by the filter driver 420 in a stream context associated with the file, wherein a stream context comprises a kernel-mode structure that represents the physical file (and wherein the file object, or file objects if multiple handles have been opened on the file, each hold a pointer to the stream context); a file may have multiple streams. Alternatively, the I/O record filter driver 420 may independently maintain information indicating that the file is a mapped file. In any event, any incoming paging I/Os from a mapped file are recognized and recorded, while other paging I/Os are not recorded.

Figure 5:
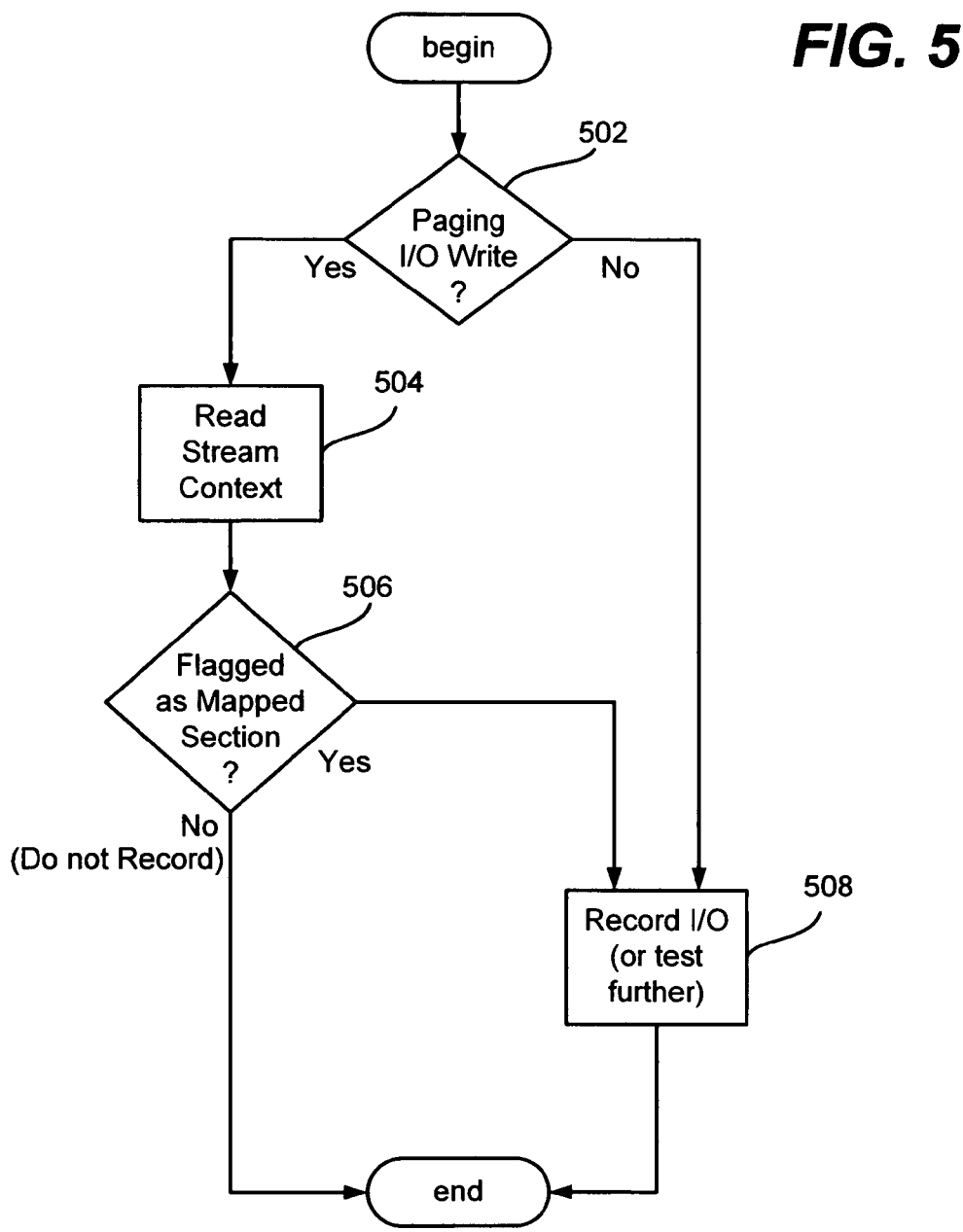
FIG. 5 is a flow diagram generally representing logic for handling paging I/O requests for possible recording, in accordance with various aspects of the present invention.

FIG. 5 shows the general logic for handling paging I/Os relative to other I/Os. In general, in FIG. 5, the IRP for an I/O which may be recorded is checked for whether it is a paging write, as represented by step 502. If not, the I/O may be recorded via step 508, (although it may be subject to further testing for other possible exceptions, including for example the testing described below with reference to FIG. 7).

If the IRP is marked as a paging I/O at step 502, then the stream context for this file object is read at step 504 to determine whether (step 506) the above-described flag in the stream context was previously set to indicate that the user-mode program requested a mapped section. If so, this paging I/O resulted from a memory manager flush from a mapped memory section and needs to be recorded, as indicated by step 506 branching to step 508. If not, the write was from the cache manager flushing its write cache, and thus the I/O was already recorded and should not be recorded again.

It should be noted that read requests are handled similarly to write requests. The IRP information is recorded, although there is no block of data to write associated with a read request, as data will be obtained via the IRP rather than persisted by the IRP.

Another time that I/Os are not recorded involves reparse points, which are used for performing operations such as redirecting I/Os to another volume. In general, the file system will not succeed a requested operation if an IRP has a reparse point, and return the IRP with a status reparse error. Normally an IRP with a status indicating error is not a concern for recording purposes, as the error is handled below the I/O record filter driver driver, or passed back up to the I/O manager for sending a corresponding errorcode to the user-mode program that initiated the I/O. On replay, the IRP should result in the same error. However, reparse point errors may result in the IRP being turned around by the I/O manager and sent back through the filter drivers, e.g., with the IRP modified so that it is directed towards a different volume. Such an I/O manager indirectly-generated IRP should not be recorded, because the user-mode program did not directly request a second I/O, and the second IRP should be generated again by the I/O manager during replay.

Figure 6:
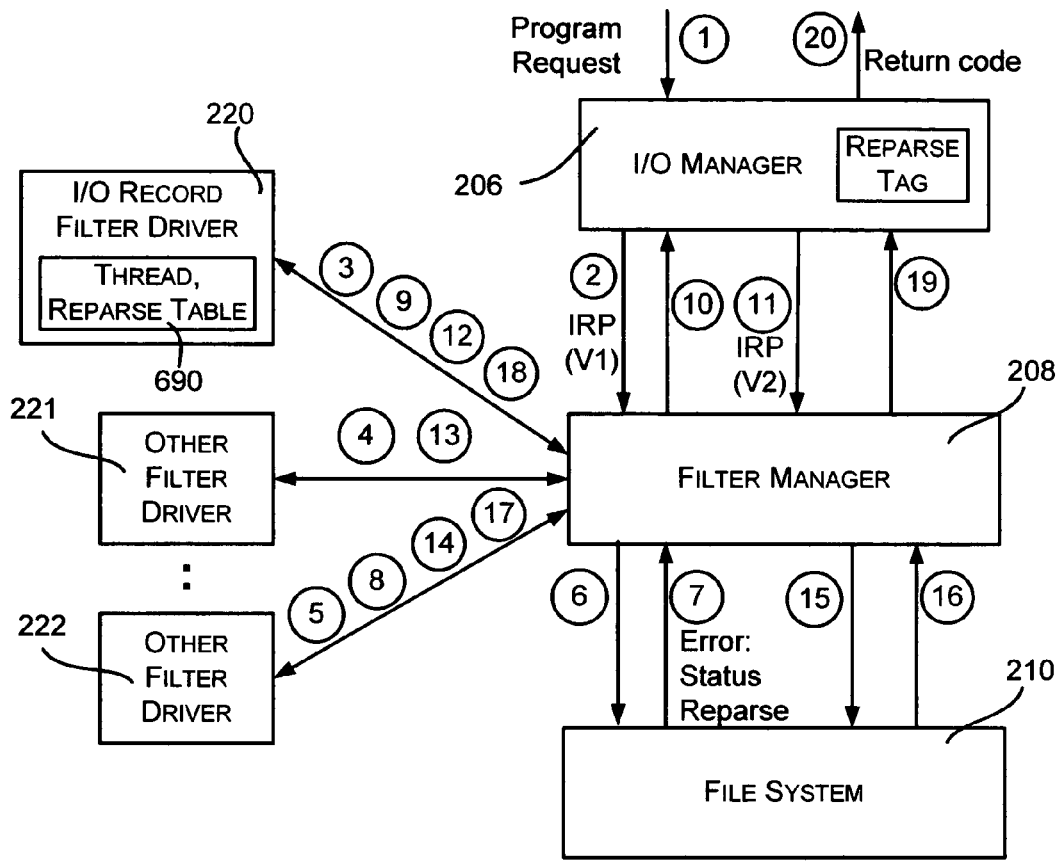
FIG. 6 is a block diagram showing how a request packet having a reparse point is processed by kernel-mode components including a filter manager architecture, in accordance with various aspects of the present invention.

FIG. 6 shows this example operation in a filter manager architecture corresponding to FIG. 2, wherein arrows labeled with numbers show the general order of I/O passing, beginning with arrow (1) where the I/O manager 206 receives a request from a user-mode program via an API call. Arrow (2) represents the I/O manager 206 having generated the corresponding IRP, which is designated for volume V1 but has a reparse point. The IRP data is provided in pre-callbacks (arrows (3), (4) and (5)), to each of the filter drivers 220-222 that are registered for IRPs of that type.

When the callbacks have completed, the filter manager 208 sends the IRP to the file system 210, represented as arrow (6), at which time the file system detects the reparse point and accordingly fails the open, represented as arrow (7). Post-callbacks are made to the filter drivers 222 and 220, represented as arrows (8) and (9); note that not all filter drivers necessarily want post-callbacks and inform the filter driver of this during the pre-callback, and thus other filter driver 221 did not receive a post-callback in this example.

When the failed IRP reaches the I/O manager 206, represented as arrow (10), the I/O manager 206 will inspect it and recognize the reparse error status. The I/O manager 206 then modifies the IRP for another volume, V2 as maintained in a reparse tag, removes the reparse point, and returns the IRP to the filter manager 208, represented by arrow (11). After the pre-callbacks, (arrows (12), (13) and (14)), the filter manager 208 passes the IRP to the file system, represented by arrow (15). This time (in this example) the request succeeds, and as represented by arrow (16) the IRP goes back up to the filter manager 208 for any post-callbacks (represented by arrows (17) and (18)). Following post-callbacks, the IRP returns to the I/O manager 206 as represented by arrow (19), and is converted to an return code corresponding to success that is then given to the user-mode program (arrow (20)).

As seen from the above-described example of FIG. 6, data of two IRPs reached the I/O record filter driver 220, however only data from the first of the IRPs is to be recorded, otherwise an extra IRP would be incorrectly generated in the replay environment. To avoid recording the second IRP, during the first IRP, the reparse point IRP data is saved in conjunction with the IRP's thread context in a table 690. When the second IRP is received, it is on the same thread context, because the I/O manager 206 does not change the thread. If there is a status reparse indicated in the table 690 for that thread, then the IRP is known to be a continuation of the other IRP, and can then be discarded. Note that this table 690 can be cleaned up on the last post callback, e.g., where the I/O manager-generated IRP has succeeded.

Figure 7:
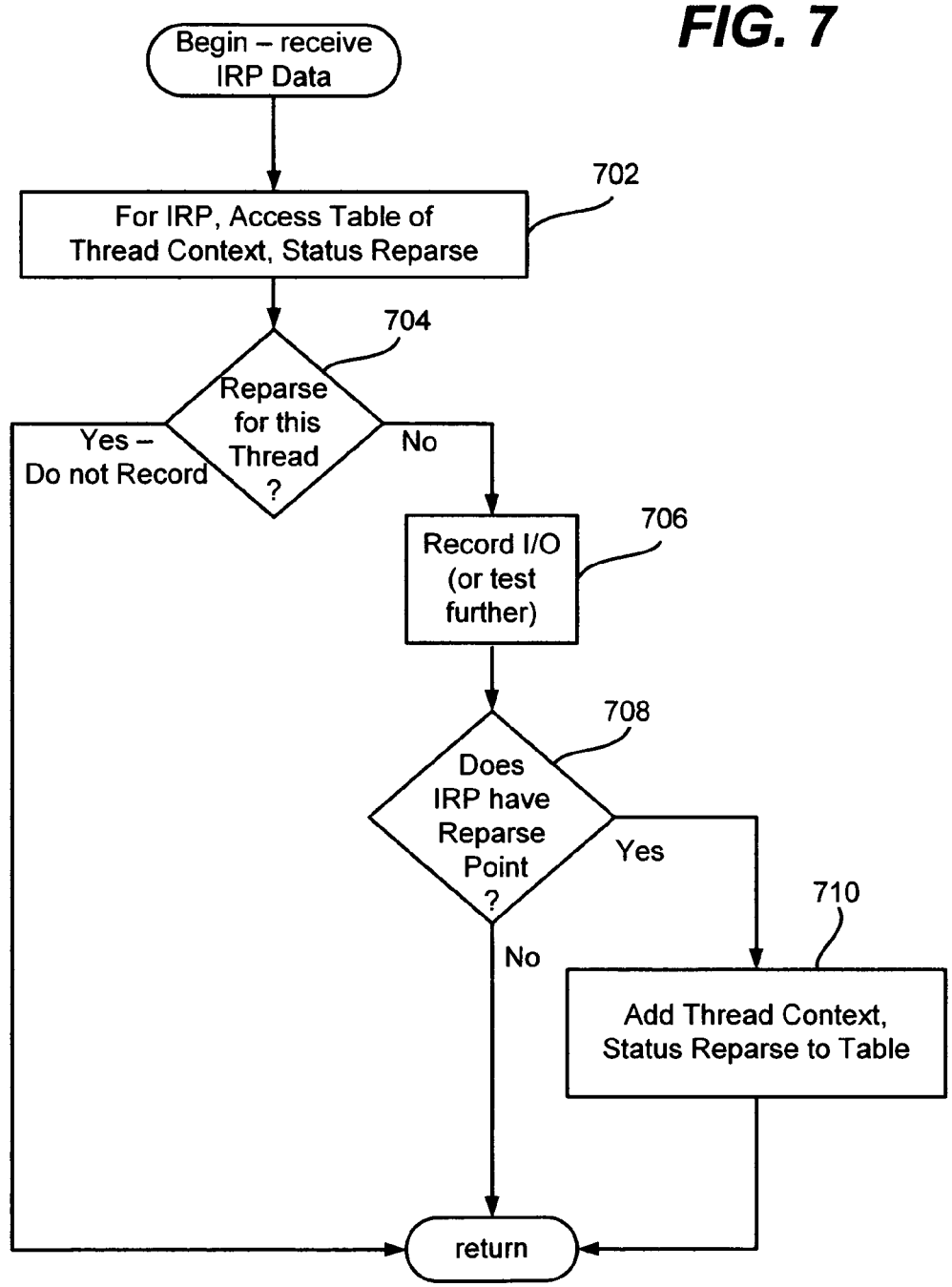
FIG. 7 is a flow diagram generally representing logic for handling I/O requests with respect to reparse points, for possible recording in accordance with various aspects of the present invention.

FIG. 7 shows the general reparse handling logic when receiving an IRP, e.g., during a pre-callback. Step 702 accesses the thread context, status reparse association table 690 to see whether the IRP's thread context is known to be associated with a reparse point, as evaluated via step 704. If so, then this IRP was generated by the I/O manager 206, and the IRP data is not recorded, as described above.

If there is no reparse point associated with this thread at step 704, the I/O is recorded (or tested further) at step 706. Then, because this IRP may have a reparse point, step 708 evaluates whether the IRP has a reparse point. If so, step 708 branches to step 710 to add the thread, reparse point association to the table 690. Otherwise the process returns from the callback. Note that FIG. 7 is simplified to describe a general way to process IRPs with respect to reparse points; there likely will be other tests (e.g., as in FIG. 5 described above) that are performed before deciding to record an I/O for playback. For example, it is understood that the tests of FIG. 5 may be merged into those of FIG. 7, or vice-versa.

Although exceptions exist as described above, in general, the typical IRP has its data recorded in conjunction with its file object data. The information that is logged comprises the volume ID, request data and parameters including the file object information, along with other data such as a block of data to be written, for example.

It is possible that recording began while the user-mode program 202 was already running, whereby at least one file handle may be opened with a corresponding file object already existing before the filter driver 220 recorded any I/O records. Another I/O on that file may be then received. When this occurs, the contents of the stream context is recorded. This will allow the replay engine 236 to determine what the file is, by name, via a table of stream contexts (which may refer to an alternate stream) maintained during replay.

Turning to an explanation of replaying the I/Os, to properly test the interaction among components with respect to I/O handling, the replay environment needs to be identical to the state of the machine before recording the I/Os, such as with respect to the storage volume or volumes and the stored contents and the type of test being performed, (although not ordinarily with respect to the changed component or components being tested). For example, if a file was deleted from a volume in the recording environment, that file needs to be present on a corresponding volume in the replay environment or the delete request will fail on replay rather than succeed as it did while recording. Similarly, the drive letters need to match, although it is understood that the replay environment may be made to artificially match the record environment, such as by substituting c:/ for d:/ in the log file prior to replay, or dynamically as needed during replay, before issuing a request. In a testing setting, it is straightforward to ensure that the replay environment matches the record environment, such as by restoring a machine to a previous state, or by taking the log file to replay its I/Os another machine that matches the environment, (but for the component or components being tested that change from the record context to the replay context).

It should be noted that the replay can continue on a detected error or halt on a detected error. Thus, it is possible to continue even if, for example, a file for which deletion occurred within the record context is not present within the replay context. The test being performed thus may allow certain types of inconsistencies between environments, depending on its purpose. Logging can also occur during replay, and the original record log compared with the replay record log to detect any differences.

In accordance with another aspect of the present invention, various information is maintained so that the replayed I/O requests will correspond to those that were sent at the time of recording the I/O requests. For example, one way a program opens a file is with a normal, full path open request, such as c:\abc\123.txt. The same path will exist in the replay context, so this is not an issue when recording such an open request. However, as described below, other I/O requests need to be properly built so that the current I/Os correspond to the recorded I/Os, e.g., storage-volume unique names and identifiers typically will change from one storage volume to a corresponding storage volume.

More particularly, for optimal replay, the replay engine of the user-mode record/replay program 230 replays I/Os the way that they were initially issued. For example, files may be created and opened in many ways; if during recording, a file was opened by the user-mode program 202 using a short name, (which is essentially a filename with an eight-character maximum followed by an optional extension of up to three characters, sometimes referred to as "8.3" format), the file is opened again with a short name at replay time, and not a long file name for that file. Similarly, files may be opened by file IDs instead of by path. If so, each such open will be recorded this way, whereby the replay engine 236 likewise will open the corresponding file by its file ID during replay.

The I/O for a file create is recorded when an IRP of type IRP_MJ_CREATE is received at the record filter driver (e.g., 220), which records a full set of create parameters. Depending on the implementation, and, for example, factors such as the goal of a particular test, security descriptors and extended attributes may or may not be recorded; note that if security descriptors are recorded and replayed, in general the replay security context will need to match (or give more rights relative to) the record security context. Any type of create is replayed in the same way it was recorded, including normal creates via a path, relative opens in which part of the path is represented by a directory handle, opens that use a File ID, and opens that use short names.

Note that volume open requests are not replayed, and need not be recorded. This is because the paths are already logged, and the user-mode record/replay application 230 ensures that the volumes are available before replay. In the replay environment, the volume handles are already known, and thus a relative open may be accomplished using a volume handle, to thereby replay a recorded relative open I/O that used the volume handle.

In kernel mode, filter drivers see FILE_OBJECT pointers and not handles. File create I/O records, as well as other I/O records, include the FILE_OBJECT. The user mode replay engine 236 running in user mode (part of IORADMIN.EXE) opens a handle by calling NtCreateFile( ), and adds an association between the FILE_OBJECT and the returned handle into a table of a set of tables 238. While the file is open, whenever this same file object is seen in a record, the corresponding handle is looked up in the table and used by the user mode replay engine to replay the I/O request. When the file is closed, the handle may be removed from the table, (or may be overwritten on the next create/open request for that file), if any. Note that the filename is maintained in the table as well for debugging purposes, giving a handle, FILE_OBJECT, filename relationship to the table. Renamed or moved files need to be updated in the table.

In the case of a relative create request, the relative FILE_OBJECT is recorded as well so that the replay engine 236 can later obtain a related handle and use it to replay the relative create request in user mode. For example, consider that the program being recorded performs a relative open, such as by opening a handle to a directory of path c:\abc, providing the directory handle (e.g., 0x68) that the file system assigns, and then requesting open of a file relative to that directory handle, e.g., open hdir\123.txt, (where hdir is 0x68 in this example). As is understood, when the directory handle was obtained, there was a corresponding file object for it. This file object data is recorded in the log file, and in the replay context, a handle obtained for it as well. When obtained in the replay context, the directory handle (e.g., 0x100) is maintained in a table in association with its file object data, in the set of tables 238. This may be the same table as that used for filenames, with the directory path maintained instead of the path to the filename for debugging purposes.

Thereafter, while that directory handle is open, the replay engine substitutes the new handle (e.g., 0x100) into an I/O request that uses that directory handle in a relative open, whereby any directory-relative I/Os work properly. In the above example where the file request is to open hdir\123.txt, the replay engine will use 0x100 as hdir for replaying this request. Note that with any of the tables 238 described herein, a secondary data structure such as a hash table based on a hash function may be used for rapid lookup of the corresponding current handle. Further, note that if a directory is renamed or moved, the table needs to be updated.

As mentioned above, another context-relative issue involves a file identifier (file ID), which in one (NTFS) file system implementation comprises a sixty-four bit number assigned by the file system to uniquely identify that file on a storage volume. A different storage volume (or possibly the same storage volume in a later state, e.g., in which files are deleted and new ones added) will not, unless coincidentally, use the same file IDs for the recorded program's files. Thus, in the case of open-by-file-ID I/O request, where there is no guarantee that the new file ID will be equal to the file ID at record time, the replay engine needs to discover the new file ID corresponding to the one recorded as the old file ID.

Among the set of tables 238, the replay engine maintains a per-volume table of file IDs containing associations between each old file ID, new file ID and filename.

The old file ID and the file name are recorded when recording all I/Os. The new file ID is discovered when needed at replay time by querying the file system, supplying the file system with the filename; (note that given a full path or a relative path, a file identifier may be obtained via a query to the file system). In one implementation, the query is indirectly accomplished by sending a message, e.g., IORE-CORD_MSG_GETFILEID, from the user mode replay engine 236 to the filter driver 220. This is because in this implementation, the file ID cannot be necessarily discovered in user mode, as a result a handle possibly opened on that file with exclusive access; such a request receives an access denied failure. The filter driver, being a privileged kernel-mode component, is able to bypass sharing access, and thus can get the new file ID. Note that in this implementation, this is one time that the replay engine 236 needs the help of the filter driver 220, and indeed, if not logging the replay I/Os, a different filter driver may be used that need not log but needs to be able to handle this message.

Once the new file ID is returned from the filter driver 220, the new file ID is known and recorded into the old file ID, new file ID and filename association table. Thereafter, the table may be accessed to translate this former file identifier to the new file identifier whenever encountered, avoiding the need to query more than once per old file ID. Again, anytime a file is renamed or moved, the path portion needs to be updated. Further, note that during replay, because a file may be created in one way and thereafter opened by its file ID, it is not guaranteed that the old file ID, new file ID and filename association table can be filled in by querying for the new file IDs prior to replaying any I/Os. In other words, some of the new file IDs may not yet exist until some replay occurs.

Object IDs, which are provided by the system and are optionally requested to correspond to a file, are handled similar to file IDs. For example, object IDs are used by the shell with an icon that points to a file, such that if the file is moved, the object ID allows the icon to still properly reference the file. A new object ID obtained as needed in the replay environment, and a table is used to substitute the correct object ID for the recorded object ID.

A similar issue involves short filenames. Given a long filename, the file system generates a short filename guaranteed to be unique within a subdirectory path. Thus, a file named longfilename1.extension may have a short filename of longfi~1.ext, while a file named longfilename2.extension may have a short filename of longfi~2.ext, and so on. However, there is no guarantee that given a long filename, the replay environment will return the same filename as the record environment, e.g., the file named longfilename2.extension may have a different short filename generated for it, e.g., longf~21.ext.

Given a full path or a relative path to a long filename, the short name may be obtained via a query to the file system. If a short name is used and recorded, a query (and thereafter a similar table lookup and substitution) is thus used to find the current short name within the replay context. The filter driver may be leveraged if necessary to avoid exclusive access issues. If the full path is associated with the old short name, new short name association, the path portion of the table is updated if the file is renamed or moved.

In this manner, creates are replayed in the same way they occurred during recording. As can be readily appreciated, this finds bugs that result from the different types of create requests requiring code to handle each differently.

Turning to closing files, another type of IRP, IRP_MJ_CLEANUP, is recorded and replayed by calling a CloseHandle( ) API. Again, because the FILE_OBJECT is recorded when logging this I/O request, the file handle associated with the FILE_OBJECT is obtained as needed from the appropriate file object to handle table in the set of tables 238.

Other recorded IRPs include IRP_MJ_SET_INFORMATION, which like other IRPs includes a file object that can be converted to a handle at replay time using the above-described table. Such IRPs are replayed by passing the same input parameters and calling the appropriate NT API, (e.g., NtSetInformationFile in case of IRP_MJ_SET_INFORMATION). For IRP_MJ_SET_INFORMATION calls, the file object is recorded along with such as attributes, time, size and so forth, and moves and renames are handled. When replayed, the handle that matches the FILE_OBJECT is found, the parameters that were recorded by the filter driver 220 are used, and the internal tables 238 are updated as need be, (e.g., for future opens by the file ID).

As generally described above with respect to recording, the replay engine 236 will replay the non-paging I/Os, and paging I/Os for mapped files. The replay of non-paging I/Os may be accomplished via calls to NtWriteFile( ). Note that normally, the write buffer is recorded in the record log so as to replay the I/O exactly. However, it is feasible to write different data depending on the test being performed. For example, for a disk space stress test, substantially much more data may be written by the replay engine than the original I/O requested, and indeed, the original write buffer need not necessarily be recorded in such a situation. The replay of paging I/Os may be accomplished via the following calls:

```
H1 = CreateFile( ) ;
H2 = CreateFileMapping(H1) ;
P = MapViewOfFile (H2, Offset, Length)
Modify memory pointed by P
CloseHandle (H2)
CloseHandle (H1)
```

Read I/O requests are replayed in a similar manner. Assuming no testing errors, the replay engine 236 will produce the exact same resultant volume state with respect to recorded and replayed paths as the originating application program did, and the resultant contents may be compared to the original to detect any bugs. The documents, other files and so forth modified by a user-mode program such as an application program will simply appear as if the application program was executed and the user performed identical actions, even though the application program need not even be installed and/or executed on the replay environment.

The following structures are used by one implementation of the present invention to maintain data common to the user mode and the kernel mode, and define messages passed down to the filter driver:

```
#ifndef _IORECORDIOCTLS_H
#define _IORECORDIOCTLS_H
#define IORECORD_FILTER_NAME      L"IORECORD"
```

-continued

```
#define IORECORD_COMMUNICATION_PORT_NAME    L"\\IoRecordCommPort"
#define IORECORD_MUPVOLUME          L"\\Device\\Mup"
#define IORECORD_VERSION_MAJOR      0x1
#define IORECORD_VERSION_MINOR      0x1
#define IORECORD_VERSION                    ((IORECORD_VERSION_MAJOR << 16) |
IORECORD_VERSION_MINOR)
#ifndef ROUND_TO_SIZE
#define ROUND_TO_SIZE(_length, _alignment)                     \
        ((((ULONG_PTR)(_length)) + ((_alignment)-1)) & ~(ULONG_PTR)
((_alignment) - 1))
#endif
#define ROUND64(_length)   ROUND_TO_SIZE (_length, sizeof(PVOID))
#ifndef Add2Ptr
#define Add2Ptr(P,I) ((PVOID)((PUCHAR) (P) + (I)))
#endif
#define MAX_SHORTNAME_LENGTH_IN_CHARS (12)             // 8.3
//
// Record sent to user mode (Always add new record type at the end
// in order to keep backward compatibility)
//
typedef enum {
      IORECORD_RECORD_TYPE_INSTANCE = 1,               // Recorded by kernel mode
      IORECORD_RECORD_TYPE_INSTANCE2,                  // Recorded by user mode
                                                       // for local disks only
      IORECORD_RECORD_TYPE_FO_STREAMCONTEXT_INFO,      // Mapping stream context,
                                                    // FILE_OBJECT (name is NULL)
      IORECORD_RECORD_TYPE_CREATE_V10,                 // Record modified for
                                                       // reparse points
      IORECORD_RECORD_TYPE_CLEANUP,
      IORECORD_RECORD_TYPE_CLOSE,
      IORECORD_RECORD_TYPE_SETINFO,
      IORECORD_RECORD_TYPE_RENAME,
      IORECORD_RECORD_TYPE_WRITE,
      IORECORD_RECORD_TYPE_FSCTL,
      IORECORD_RECORD_TYPE_VERSION,                    // Version added as the
                                                       // first record
      IORECORD_RECORD_TYPE_CREATE,
      IORECORD_RECORD_TYPE_NETWORK_QUERY_OPEN,
      IORECORD_RECORD_TYPE_LASTRECORD = 0x99           // Added when record mode
                                                       // is stopped
}   IORECORD_RECORD_TYPE ;
typedef struct _IORECORD_RECORD {
      IORECORD_RECORD_TYPE RecordType ;
      ULONG RecordSize ;
      NTSTATUS Status;
      LARGE_INTEGER Time;
      LONG RecordNumber ;
      LONGLONG FileObject;
      LONGLONG StreamContext ;    // Unique way to identify FCB
      ULONG_PTR ProcessId;
      ULONG_PTR ThreadId;
      union {
            struct {
                  GUID           InstanceGuid ;         // Instance GUID
                  BOOLEAN        IsDirectory ;          // TRUE if directory
                  LONGLONG       RelatedFileObject ;    // Related FO
                  LONGLONG       RelatedStreamContext ; // Initialized only
                                                        // if Related FO is not NULL
                  ACCESS_MASK    DesiredAccess ;        // Desired access
                  LARGE_INTEGER  AllocationSize ;       // Allocation size
                  ULONG          FileAttributes;        // File attributes
                  ULONG          ShareAccess ;          // Share access
                  UCHAR          CreateDisposition;
                  ULONG          CreateOptions ;
                  LARGE_INTEGER  FileId ;               // Zero if not set
                  USHORT         ShortNameLength ;      // Zero if not set
                  WCHAR          ShortName[MAX_SHORTNAME_LENGTH_IN_CHARS] ;
                                                        // 8.3
                  USHORT         OpenPathLength;   // Path used to open file
                  USHORT         NormalizedFullPathLength;    // Normalized path
                                                 // length to match short names and file IDs
                  WCHAR          PathAndData[1];        // OpenPath followed
                                                        // by normalized path
            } Create_v10 ;
            struct {
                  GUID           InstanceGuid ;         // Instance GUID
                  GUID           TargetInstanceGuid ;   // Used in case of
                                                 // STATUS_REPARSE for the target file
                  BOOLEAN        IsDirectory ;          // TRUE if directory
                  LONGLONG       RelatedFileObject ;    // Related FO
```

```
            LONGLONG            RelatedStreamContext ;          // Initialized if
                                                                // Related FO is not NULL
            ACCESS_MASK         DesiredAccess ;                 // Desired access
            LARGE_INTEGER       AllocationSize ;                // Allocation size
            ULONG               FileAttributes;                 // File attributes
            ULONG               ShareAccess ;                   // Share access
            UCHAR               CreateDisposition;
            ULONG               CreateOptions ;
            LARGE_INTEGER       FileId ;                        // Zero if not set
            USHORT              ShortNameLength ;               // Zero if not set
            WCHAR               ShortName[MAX_SHORTNAME_LENGTH_IN_CHARS] ;
                                                                // 8.3
            USHORT              OpenPathLength;                 // Path used to
                                                                // open file
            USHORT              NormalizedFullPathLength;       // Normalized path
                                // length to match short names and file IDs
            WCHAR               PathAndData[1];                 // OpenPath followed
                                                                // by normalized path
        } Create ;
        struct {
            GUID                InstanceGuid ;                  // Instance GUID
            GUID                TargetInstanceGuid ;            // Used in case of
                                // STATUS_REPARSE for the target file
            LONGLONG            RelatedFileobject ;             // Related FO
            LONGLONG            RelatedStreamContext ;          // Initialized if
                                                                // Related FO is not NULL
            USHORT              OpenPathLength;                 // Path used to
                                                                // open file
            USHORT              NormalizedFullPathLength;       // Normalized path
                                // length to match short names and file IDs
            FILE_NETWORK_OPEN_INFORMATION Info ;                // Result of the IO
            WCHAR               Paths[1];                       // OpenPath
                                // followed by normalized path
        } NetworkQueryOpen ;
        struct {
            FILE_INFORMATION_CLASS InfoClass ;
            union {
                FILE_BASIC_INFORMATION    BasicInformation;
                                                                // BASIC_INFORMATION
                BOOLEAN                   Delete ;
                                                                // FileDispositionInformation
                LARGE_INTEGER             Size ;                // For SetInfo
                                // classes including only LARGE_INTEGER
            } ;
        } SetInfo ;
        struct {
            FILE_INFORMATION_CLASS InfoClass ;                  // Rename or link
            GUID                InstanceGuid ;                  // Instance GUID
            BOOLEAN             IsDirectory ;                   // TRUE if directory
            BOOLEAN             ReplaceIfExists;                // From
                                                                // FILE_RENAME_INFORMATION
            ULONGLONG           RootDirectory;                  // file object is stored and
                                                                // not a handle (for replay)
                                                                // (unlike FILE_RENAME_INFORMATION)
ULONG       TargetFileNameLength;                               // Target file name as passed
                                                                // in FileRenameInformation
            ULONG               NormalizedTargetFileNameLength; // Normalized
                                // target file name without volume name
            WCHAR               Names[1] ;   // Target file name followed by
                                             // normalized file name
        } Rename ;
        struct {
            GUID        Guid ;                                  // Instance GUID
            USHORT      VolumeNameLength ;                      // Length of volume name
            WCHAR       VolumeName[1] ;                         // Volume name
        } Instance ;
        struct {
            GUID        Guid ;                                  // Instance GUID
            USHORT      VolumeDosNameLength;                    // DOS name length
            WCHAR       VolumeDosName[1] ;                      // Volume name
        } Instance2 ;
        struct {
            BOOLEAN         PagingIo ;
            BOOLEAN         NoCache ;
            BOOLEAN         IsSection ;
            ULONGLONG       Offset ;
            ULONG           Length ;
            ULONG           BytesWritten ;
            char            Buffer[1] ;
        } Write ;
```

```
            struct {
                GUID            InstanceGuid ;              // Instance GUID
            }   FoStreamContext ;
            struct {
                ULONG           FsControlCode ;             // FSCTL code
                ULONG           OutputBufferLength ;        // Ignore contents of
                                                            // output buffer
                ULONG           InputBufferLength ;         // Input buffer is
                                                            // copied into record
                char            InputBuffer[1] ;
            }   Fsctl ;
            struct {
                ULONG           VersionNumber ;   // Version # = (max << 16) | min
            }   Version ;
    };
}   IORECORD_RECORD, *PIORECORD_RECORD ;
//
// Record list
//
typedef struct _IORECORD_RECORD_ENTRY {
    LIST_ENTRY ListEntry ;
    IORECORD_RECORD Record ;                    // At the end of that structure as the
                                                // record length may vary
}   IORECORD_RECORD_ENTRY, *PIORECORD_RECORD_ENTRY ;
//
// Messages sent down to IORECORD communication port
//
typedef enum {
    IORECORD_MSG_ADDPREFIX = 1,         // Add prefix
    IORECORD_MSG_ADDEXCLUDEPREFIX,      // Add exclude prefix
    IORECORD_MSG_REMOVEPREFIX,          // Not implemented
    IORECORD_MSG_RESETPREFIX,           // Reset prefix list
    IORECORD_MSG_RESETALLPREFIX,        // Reset prefix list on all instances
    IORECORD_MSG_STARTRECORDING,        // Start recording
    IORECORD_MSG_STOPRECORDING,         // Stop recording
    IORECORD_MSG_GETRECORDS,            // Get records
    IORECORD_MSG_GETFILEID,             // Get New File ID when replaying
                                        // CREATE by file ID IORECORD_MSG_MAX
}   IORECORD_MSG_TYPE ;
typedef struct _IORECORD_MESSAGE {
    IORECORD_MSG_TYPE MsgType ;
    union {
        //
        // RECORD Messages
        //
        struct {
            USHORT VolumeLength ;               // Volume length in bytes
            USHORT PrefixLength ;               // Prefix length in bytes
            WCHAR Names[1] ;                    // VolumeName followed by PrefixName
        }   AddPrefix ;
        struct {
            USHORT VolumeLength ;               // Volume length in bytes
            WCHAR VolumeName[1] ;               // VolumeName
        }   ResetPrefix ;
        struct {
            ULONG Flags ;                       // Unused
        }   StartRecording;
        struct {
            ULONG Flags ;                       // Unused
        }   StopRecording;
        struct {
            ULONG Flags ;                       // Unused
        }   GetRecords ;
        //
        // REPLAY Messages
        //
        struct {
            USHORT FileNameLength ;             // File name length in bytes (NT
                                                // format, call RtlDosPathNameToNtPathName_U
                                                // in user mode)
            WCHAR FileName[1] ;                 // File name
        }   GetFileId ;
    };
}   IORECORD_MESSAGE, *PIORECORD_MESSAGE ;
#endif
```

As can be seen from the foregoing detailed description, there is provided a method and system that record and replay user mode I/O requests in a substantially identical manner. This allows testing tasks that otherwise have to be done manually to be automated, such as when testing the compatibility of file system-related components with user-mode programs when handling I/O requests.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method for testing the interoperability of programs by recording input/output (I/O) request data of a user-mode program and later recreating the user-mode program's input/output data allowing testing of a variety of components using the same input/outputs for each test relating to the user-mode program, regardless of the presence or absence of the user-mode program at the time the variety of components are tested, the method comprising:
   in a record context, wherein an instance of the user-mode program of a computing system is being executed, obtaining I/O requests of the user-mode program directed to at least one storage volume associated with the computing system;
   sending the I/O requests of the user-mode program to at least one kernel-mode filter driver of the computing system, wherein the at least one kernel-mode filter driver records data into a log file, the recorded data corresponding to the I/O requests of the user-mode program directed to the at least one storage volume; and
   in a replay context that is within the computing system and is a modified test setting having the at least one kernel-mode filter driver modified from its state when the I/O requests were obtained in the record context and in which the instance of the user-mode program is no longer being executed, constructing the I/O requests based on the data in the log file, including for at least one I/O request, and constructing the I/O request with information relevant in the replay context, wherein constructing the I/O request with information relevant in the replay context comprises modifying the recorded I/O request to reflect the replay context having the modified test setting rather than the record context present in the recorded data in the log file.

2. The method of claim 1 wherein recording data into a log file comprises:
   processing data corresponding to the I/O request to determine whether the I/O request data was directly generated by a request from the user-mode program;
   when the I/O request data is determined to be directly generated by a request from the user-mode program, recording the I/O request data into the log file; and
   when the I/O request data is not determined to be directly generated by a request from the user-mode program, excluding the I/O request data from being written to the log file.

3. The method of claim 2 wherein processing data corresponding to the I/O request comprises determining whether the I/O request corresponds to a paging write request.

4. The method of claim 3 wherein the data corresponding to the I/O request indicates a paging write request, and further comprising, recording the paging write request when corresponding to a mapped section.

5. The method of claim 2 wherein processing data corresponding to the I/O request comprises determining whether the I/O request corresponds to a request indirectly generated because of a reparse point.

6. The method of claim 5 wherein determining whether the I/O request corresponds to a request indirectly generated because of a reparse point comprises, accessing a table that associates thread context data with reparse point data.

7. The method of claim 1 wherein constructing the I/O request with information relevant in the replay context comprises providing a file handle relevant in the replay context with the I/O request.

8. The method of claim 1 wherein constructing the I/O request with information relevant in the replay context comprises providing a directory handle relevant in the replay context with the I/O request.

9. The method of claim 1 wherein constructing the I/O request with information relevant in the replay context comprises providing a file identifier relevant in the replay context with the I/O request.

10. The method of claim 9 further comprising, querying to a file system for the file identifier.

11. The method of claim 10 wherein querying to a file system for the file identifier includes communicating from a user mode replay engine to a kernel mode component to make the query.

12. The method of claim 1 wherein constructing the I/O request with information relevant in the replay context comprises providing a volume identifier relevant in the replay context with the I/O request.

13. The method of claim 1 wherein constructing the I/O request with information relevant in the replay context comprises providing a file short name that is relevant in the replay context with the I/O request.

14. The method of claim 1 wherein recording data into a log file comprises recording, for at least one I/O request, volume identification data, file object data, request type information, and request parameters.

15. One or more computer-readable storage media storing computer-executable instructions which when executed perform the method of claim 1.

16. The method of claim 1, wherein:
   recording data into a log file comprises:
      processing data corresponding to the I/O request to thereby determine whether the I/O request data was directly generated by a request from the user-mode program;
      determining that the JIG request was a paging write request;
      determining whether the paging write request corresponds to a write request for a mapped section;
      for all I/O request data determined to be a paging write request that also corresponds to a write request for a mapped section, using the kernel-mode filter driver to record the I/O request data into the log file;
      for all I/O request data determined to be a paging write request that does not correspond to a write request for a mapped section, excluding the I/O request data from being written to the log file;
   the at least one kernel-mode filter driver includes a filter driver that limits an amount of space available to at least one user on the at least one storage volume;
   constructing the I/O request with information relevant in the reply context that is a modified test setting is configured to detecting bugs in kernel-mode filter drivers that handle I/O below the user-mode program level by testing compatibility of kernel-mode filter drivers and the user-mode program; and the kernel-mode filter driver recording data into the log file includes recording at least:

volume identification data, file object data, request type data, and request parameters.

17. In a computing environment, one or more computer-readable storage media for implementing a computing system for testing the interoperability of programs by recording input/output (I/O) request data of a user-mode program and later recreating the user-mode program's input/output data, thereby allowing testing of a variety of components using the same input/outputs for each test relating to the user-mode program, regardless of the presence or absence of the user-mode program at the time the variety of components are tested, the computer-readable storage media comprising:

at least one storage medium, wherein the storage medium has stored thereon computer-executable instructions that define:

a recording mechanism that operates in a record context that includes an instance of the user-mode program being executed, the record mechanism including logic to receive I/O requests of the user-mode program and the record mechanism including at least one kernel-mode component that records data into a log file, the recorded data corresponding to I/O requests of the user-mode program, the I/O requests being directed to at least one storage volume; and a replay engine that operates in a replay context which is a modified test setting have the at least one kernel-mode component modified from its state when the I/O requests were received and in which the instance of the user-mode program is no longer being executed, the replay engine having logic that reproduces the I/O requests of the user-mode program by processing the data of the log file data into corresponding I/O requests, wherein processing the data of the log file data into corresponding I/O requests comprises modifying the recorded I/O request data to reflect the replay context having the modified test setting rather than the record context present in the recorded data.

18. The computer-readable storage media of claim 17 with the computer-executable instructions further defining a set of at least one data structure containing information relevant in the replay context that is accessed by the replay engine to construct at least one I/O request.

19. The computer-readable storage media of claim 18 wherein a data structure of the set includes an association between recorded file object data and a file handle, the file handle obtained in the replay context based on the recorded file object data.

20. The computer-readable storage media of claim 18 wherein a data structure of the set includes an association between recorded directory data and a directory handle, the directory handle obtained in the replay context based on the recorded directory data.

21. The computer-readable storage media of claim 18 wherein a data structure of the set includes an association between a file identifier in the record context, file name data and a file identifier in the replay context, the identifier in the replay context obtained in the replay context via a query to the file system that provides the file name data.

22. The computer-readable storage media of claim 17 with the computer-executable instructions further defining an I/O manager coupled to the recording mechanism, wherein the kernel mode filter driver receives data corresponding to I/O request packets generated by the I/O manager based on I/O requests received from the user mode program.

23. The computer-readable storage media of claim 22 with the computer-executable instructions further defining a filter manager coupled to the I/O manager and the kernel mode filter driver, wherein the kernel mode filter driver receives the data from the filter manager.

24. The computer-readable storage media of claim 17 wherein the record context includes a first set of kernel-mode components and the replay context includes a second set of kernel-mode components, and wherein the system comprises a test system that looks for differences in I/O processing between the first and second sets of kernel-mode components.

25. The computer-readable storage media of claim 17 wherein the recording mechanism includes logic for detecting data corresponding to I/O requests that were not directly provided by the user-mode program, wherein data corresponding to I/O requests not directly provided by the user-mode program are not recorded.

26. The computer-readable storage media of claim 25 wherein the logic detects paging I/O write requests and wherein the recording mechanism does not record such requests unless the paging I/O requests corresponds to a write request for a mapped section.

27. The computer-readable storage media of claim 25 wherein the logic detects requests on a thread context associated with a reparse point, and wherein the recording mechanism does not record such requests.

28. The computer-readable storage media of claim 17 wherein the recording mechanism includes logic for detecting data corresponding to I/O requests that were not directly provided by the user-mode program.

29. At least one computer-readable storage medium for causing recording input/output (I/O) request data of a user-mode program allowing the later recreation of the user-mode program's input/output data for testing of a variety of components using the same input/outputs for each test relating to the user-mode program, regardless of the presence or absence of the user-mode program at the time the variety of components are tested, comprising:

at least one storage medium, wherein the at least one storage medium has stored thereon computer-executable instructions that, when executed, cause a computing system to:

during runtime of a user-mode program, detect whether a set of input/output (I/O) data corresponding to an I/O request of a user-mode program was directly generated in response to the I/O request of the user-mode program;

when the request was detected as being directly generated, record the I/O request data of the set into a log file for later replay; and when the request was not detected as being directly generated, exclude the I/O request data of the set from being written to the log file.

30. The computer-readable storage medium of claim 29, wherein execution of the computer-executable instructions further causes the computing system to determine that the request was not directly generated, which comprises detecting that the data corresponding to the I/O request is marked with a paging flag.

31. The computer-readable storage medium of claim 30, wherein determining that the request was not directly generated, further comprises detecting that the I/O request does not correspond to a mapped file section.

32. The computer-readable storage medium of claim 29, wherein execution of the computer-executable instructions further causes the computing system to determine that the request was not directly generated, which comprises detecting that the data corresponding to the I/O request has a thread context associated with a reparse point.

33. The computer-readable storage medium of claim 29, wherein execution of the computer-executable instructions further causes the computing system to replaying an I/O request corresponding to the I/O request of the user-mode program based on the data recorded in the log file.

34. At least one computer-readable storage medium for causing reproduction of input/output (I/O) request data of a user-mode program regardless of the presence or absence of the user-mode program at the time I/O request data is reproduced, thereby testing of a variety of components using the same input/outputs for each test relating to the user-mode program, comprising:

at least one storage medium, wherein the at least one storage medium has stored thereon computer-executable instructions that, when executed, cause a computing system to:

in a replay context that is a modified test setting having at least one kernel mode component modified from a state during a record context which I/O requests are made within a user-mode program, which modified test setting does not include an instance of the user-mode program being executed, reproduce (I/O) requests from data previously recorded in the record context in which the user-mode program was executed, for the user-mode program into a log file having data written by the at least one kernel mode component, by processing the data of the log file into corresponding I/O requests, wherein processing the data into corresponding I/O requests comprises modifying the recorded I/O request data to reflect the replay context having the modified test rather than the record context present in the recorded data in the log file; and send the reproduced input/output requests to perform file system-related operations in a manner that reproduces the behavior of the user-mode program.

35. The computer-readable storage medium of claim 34, wherein execution of the computer-executable instructions further causes the computing system to construct the I/O request, which comprises obtaining a handle relevant in the replay context.

36. The computer-readable storage medium of claim 35, wherein obtaining the handle includes receiving the handle in response to the request.

37. The computer-readable storage medium of claim 36, wherein execution of the computer-executable instructions further causes the computing system to maintain the handle in a data structure for lookup as needed for any subsequent I/O request.

38. The computer-readable storage medium of claim 34, wherein execution of the computer-executable instructions further causes the computing system to construct the I/O request, which comprises obtaining at least one data item from a set of data items, the set containing: a file handle, a directory handle, a volume handle, a volume identifier, a file identifier, a stream context and a short file name.

39. The computer-readable storage medium of claim 34 wherein sending the reproduced input/output requests comprises calling an application programming interface set.

* * * * *